(12) United States Patent
Torazawa et al.

(10) Patent No.: US 6,400,653 B1
(45) Date of Patent: Jun. 4, 2002

(54) INFORMATION RECORDING/REPRODUCING APPARATUS TO RECORD/REPRODUCE INFORMATION ON A RECORDING MEDIUM RECORDED WITH AN ADDRESS MARK

(75) Inventors: Kenji Torazawa, Ogaki; Kenji Asano, Kakamigahara; Satoshi Sumi, Gifu; Yoshiharu Uchihara, Ogaki; Noboru Mamiya, Motosu-gun; Toshiaki Hioki, Ogaki, all of (JP)

(73) Assignee: Sanyo Electric Co. Ltd., Osaka (JP)

( * ) Notice: Subject to any disclaimer, the term of this patent is extended or adjusted under 35 U.S.C. 154(b) by 0 days.

(21) Appl. No.: 09/355,831

(22) PCT Filed: Feb. 6, 1998

(86) PCT No.: PCT/JP98/00513

§ 371 Date: Aug. 5, 1999

(87) PCT Pub. No.: WO98/35347

PCT Pub. Date: Aug. 13, 1998

(30) Foreign Application Priority Data

Feb. 7, 1997 (JP) .............................................. 9-25654
Jun. 3, 1997 (JP) ............................................. 9-145193

(51) Int. Cl.⁷ .............................................. G11B 11/00
(52) U.S. Cl. ............................... 369/13.02; 369/47.48; 369/275.3
(58) Field of Search ............................. 369/13, 275.3, 369/275.4, 277, 278, 279, 174, 175, 44.26, 44.29, 44.13, 59.25, 47.19, 59.75, 13.02, 13.14, 13.17, 13.35, 13.55, 53.2, 124.01, 47.01, 47.48, 53.29

(56) References Cited

U.S. PATENT DOCUMENTS 5,715,217 A * 2/1998 Fuji ........................ 369/44.26
5,754,522 A * 5/1998 Kobayashi et al. ......... 369/275.3

FOREIGN PATENT DOCUMENTS

| JP | 6-96447 | 4/1994 |
| JP | 6-301976 | 10/1994 |
| JP | 7-210873 | 8/1995 |
| JP | 7-296389 | 11/1995 |

OTHER PUBLICATIONS

Japanese Journal of Applied Physics, vol. 28, Supplement 28–3, pp. 197–200, 1989.

* cited by examiner

Primary Examiner—Ali Neyzari
(74) Attorney, Agent, or Firm—Armstrong, Westerman & Hattori, LLP

(57) ABSTRACT

An magneto-optical disc recording/reproducing apparatus includes an optical head (36) to detect a wobble (46) and an address mark (81 to 84) in an magneto-optical disc (31) and output a wobble signal (WB1, WB2) and an address mark signal (AML, AMG), a PLL circuit (47) to generate a clock signal (CK) in response to wobble signal (WB1), an address mark synchronous signal generation circuit (46) to generate an address mark synchronous signal (AM) in response to address mark signal (AML, AMG), a synchronizing circuit (48) to synchronize clock signal (CK) with address mark synchronous signal (AM) and generate a synchronized clock signal (SCK), and a timing setting circuit (49) to generate a timing pulse signal (TG1) to control a magnetic head driving circuit (34) and a timing pulse signal (TG2) to control a laser driving circuit (35). The recording/reproducing apparatus can detect a address mark (81 to 84), record la data signal on magneto-optical disc (31) in synchronization with the detected address mark, and reproduce a data signal from magneto-optical disc (31) in synchronization with the detected address mark, so that the data signal can be surely recorded/reproduced.

10 Claims, 12 Drawing Sheets

WB2+TE

WB1

DWB1

CK

*FIG.12A*
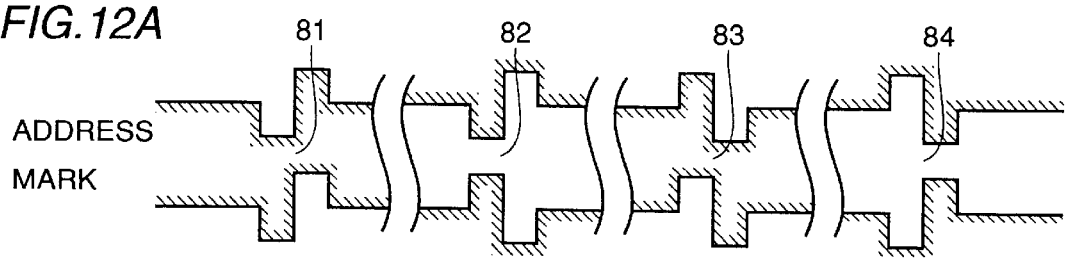
*FIG.12B* CNT
*FIG.12C* AMG
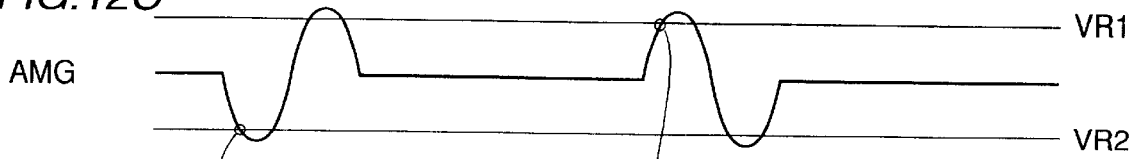
*FIG.12D* AML
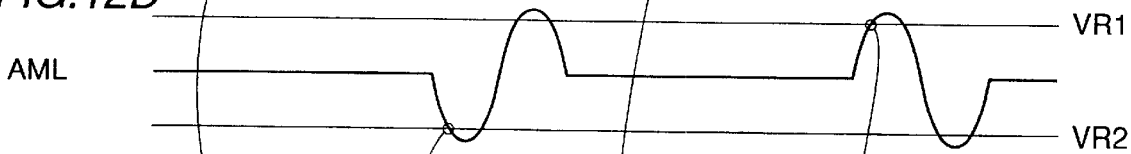
*FIG.12E* AMO
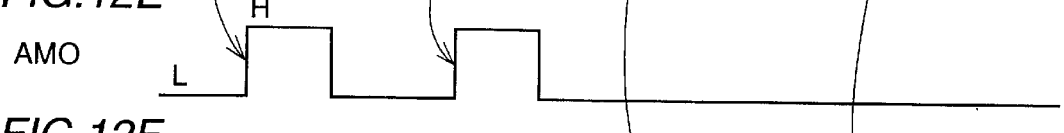
*FIG.12F* AME
*FIG.12G* AM
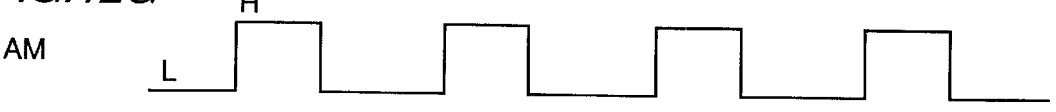

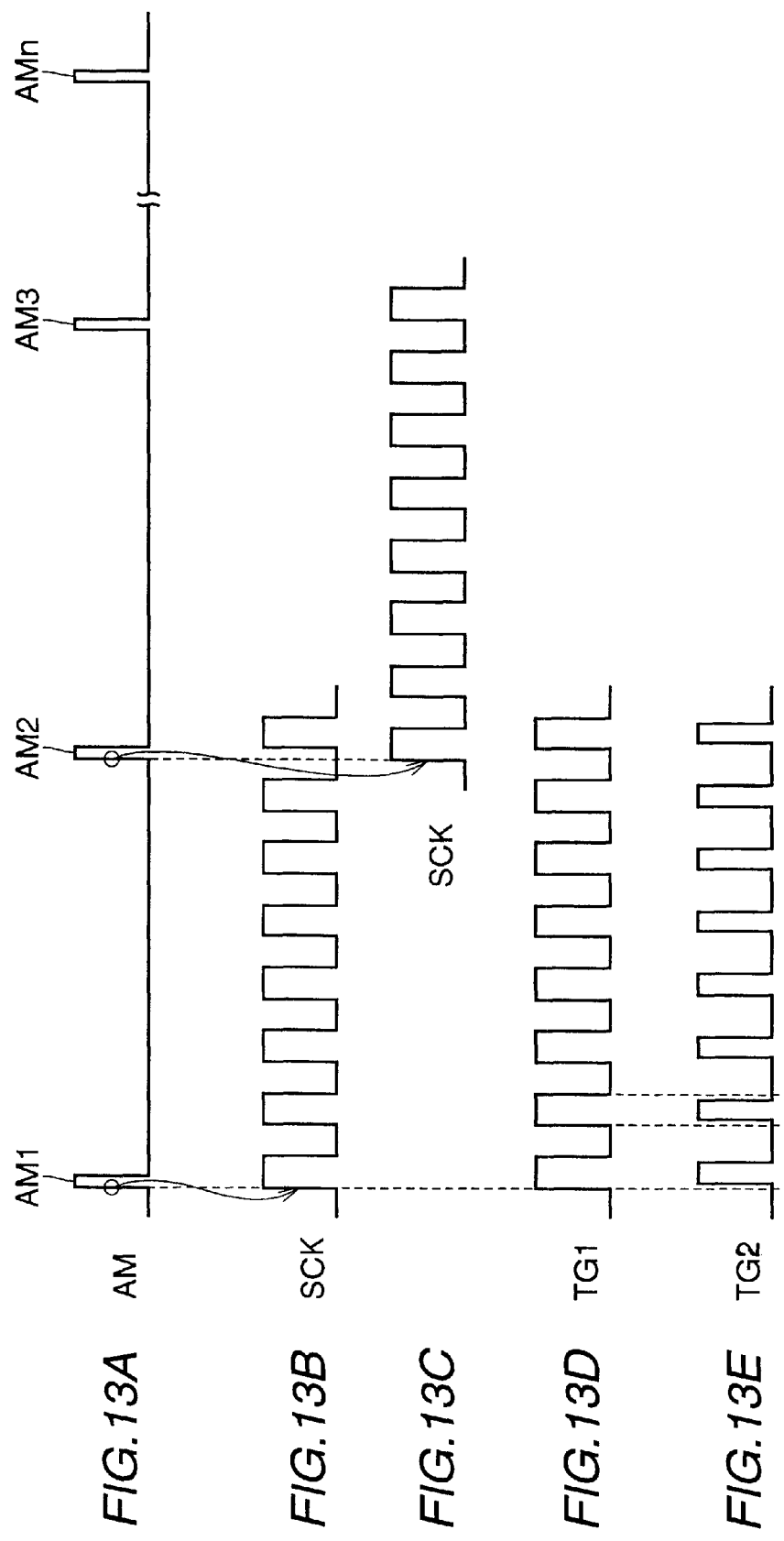

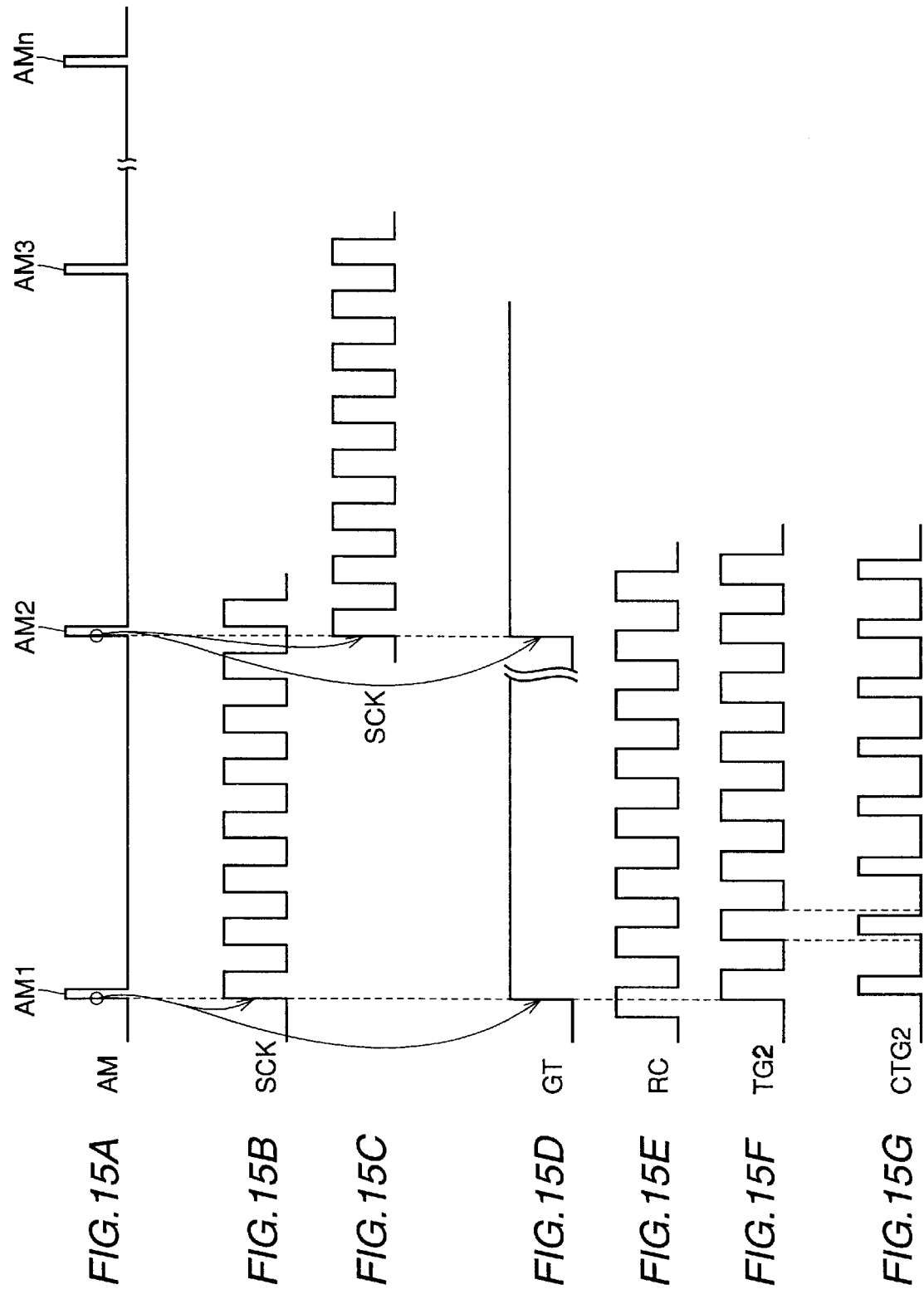

INFORMATION RECORDING/ REPRODUCING APPARATUS TO RECORD/ REPRODUCE INFORMATION ON A RECORDING MEDIUM RECORDED WITH AN ADDRESS MARK

TECHNICAL FIELD

The present invention relates to information recording/ reproducing apparatuses, and more particularly, to an apparatus which records information on an optical disc recorded with an address mark to identify which one of two addresses is an address for groove or an address for land, and reproduces information from the optical disc.

BACKGROUND ART

The magneto-optical disc has attracted much attention as a rewritable recording medium having a large storage capacity and high reliability, and has been reduced to practice for use for example as a computer memory. With increase in the amount of information and development of more compact devices, there is a demand for a recording/reproducing techniques which allows for higher density.

The high density recording/reproducing techniques involves a technique on the apparatus side and a technique on the medium side. One of high density recording/ reproducing techniques on the former side is a method of optical recording by superresolution which permits light collected spot exceeding the limit of laser beam diffraction by optical super resolution with a shielding member inserted in the optical path. One such approach is for example disclosed in detail in "High Density Optical Recording by Supperresolution", Yamanaka et al., Japanese Journal of Applied Physics, Vol. 28 (1989), Supplement 28–3, pp. 197–200. The latter technique includes reducing the pitch of a medium and improving reproducing resolution by the use of a magnetic multi-layer film. The technique of improving the reproducing resolution takes advantage that a Gaussian distribution of the temperature of a light collected spot is maximized in the vicinity of the center and the state of a recorded layer is selectively transferred to a reproducing layer for reading the state of the reproducing layer.

In a recently developed, so-called land-groove type magneto-optical disc, grooves are wobbled to record a synchronizing clock and an address for recording and reproducing. When a groove is wobbled to record an address, the address for the groove can be recorded, but an address for a land can be hardly recorded. Therefore, the applicant has proposed a method of sequentially recording addresses for both groove and land by wobbling the groove, thereby recording an address mark to identify which one of the two addresses is an address for groove or an address for land in a previously filed international application (International Application No. PCT/JP97/02442, the international filing date of which is Jul. 14, 1997).

According to the technique, a groove is wobbled, so that not only an address for a groove but also an address for a land can be recorded. However, specific techniques to record/reproduce a data signal to/from such a magneto-optical disc has not been suggested.

It is therefore an object of the present invention to provide an information recording apparatus which can surely record information to a recording medium recorded with an address mark and an information reproducing apparatus which can surely reproduce information from a recording medium recorded with an address mark.

DISCLOSURE OF INVENTION

An information recording apparatus according to the present invention includes detection means to detect an address mark and recording means to record information on a recording medium in synchronization with the detected address mark. The detection means preferably includes an optical head and an address mark synchronous signal generation means. The optical head includes a laser to direct a beam to a recording medium and outputs an address mark signal in response to an address mark. The address mark synchronous signal generation means generates an address mark synchronous signal in synchronization with an address mark in response to an address mark signal. The recording means includes a magnetic head, magnetic head driving means, and laser driving means. The magnetic head driving means drives the optical head in synchronization with an address mark synchronous signal. The laser driving means drives the laser in synchronization with an address mark synchronous signal. More preferably, the address mark is recorded by forming a wobble on at least one sidewall of a groove. The optical head outputs a wobble signal in response to a wobble. The detection means further includes a phase synchronizing circuit and synchronizing means. The phase synchronizing circuit generates a clock signal in synchronization with the wobble in response to the wobble signal. The synchronizing means synchronizes the clock signal with an address mark synchronous signal. The magnetooptical head driving means drives the magnetic head in response to the synchronized clock signal. The laser driving means drives the laser in response to the synchronized clock signal.

In the information recording apparatus, an address mark recorded on a recording medium is detected, and an address mark signal is output from the optical head based on the address mark and an address mark synchronous signal is generated in synchronization with the address mark signal. The magnetic head and laser are driven in synchronization with the address mark synchronous signal. More specifically, a wobble signal is output from the optical head based on a wobble formed on a sidewall of a groove, and a clock signal in synchronization with the wobble is generated in response to the wobble signal. The clock signal is synchronized with an address synchronous signal and the magnetic head and laser are driven in response to the synchronized clock signal. Thus, information may be surely recorded on a recording medium in synchronization with the address mark.

An information reproducing apparatus according to the present invention includes detection means to detect an address mark and reproducing means to reproduce information from a recording medium in synchronization with the detected address mark. The detection means preferably includes an optical head and address mark synchronous signal generation means. The optical head includes a laser to direct a beam upon the recording medium, and outputs an address mark signal based on an address mark. The address mark synchronous signal generation means generates an address mark synchronous signal in synchronization with an address mark in response to the address mark signal. The reproducing means includes laser driving means to drive a laser in synchronization with an address mark synchronous signal. More preferably, the address mark is recorded by forming a wobble on at least one sidewall of a groove. The optical head outputs a wobble signal based on a wobble. The detection means further includes a phase synchronizing circuit and synchronizing means. The phase synchronizing circuit generates a clock signal in synchronization with a wobble in response to a wobble signal. The synchronizing means synchronizes a clock signal with an address mark synchronous signal. The laser driving means drives the laser in response to the synchronized clock signal.

In the information reproducing apparatus, an address mark recorded on a recording medium is detected, and an address mark signal is output based on the address mark from the optical head. An address mark synchronous signal in synchronization with the address mark is generated in response to the address mark signal, and the laser is driven in synchronization with the address mark synchronous signal. More specifically, a wobble signal is output from the optical head based on a wobble formed on a sidewall of a groove, and a clock signal in synchronization with the wobble is generated in response to the wobble signal. The clock signal is synchronized with the address mark synchronous signal, and the laser is driven in response to the synchronized clock signal. Thus, information can be surely reproduced from the recording medium.

BRIEF DESCRIPTION OF DRAWINGS

FIGS. 12A to 12G are timing charts for use in illustration of the operation of the address mark synchronous signal generation circuit shown in FIG. 9;

FIGS. 13A to 13E are timing charts for use in illustration of a synchronizing circuit, a timing setting circuit and a duty correction circuit in the magneto-optical disc recording/ reproducing apparatus shown in FIG. 6;

FIGS. 15A to 15G are timing charts for use in illustration of the operation of a synchronizing circuit, a timing setting circuit and a duty correction circuit shown in FIG. 14.

BEST MODE FOR CARRYING OUT THE INVENTION

Figure 1:
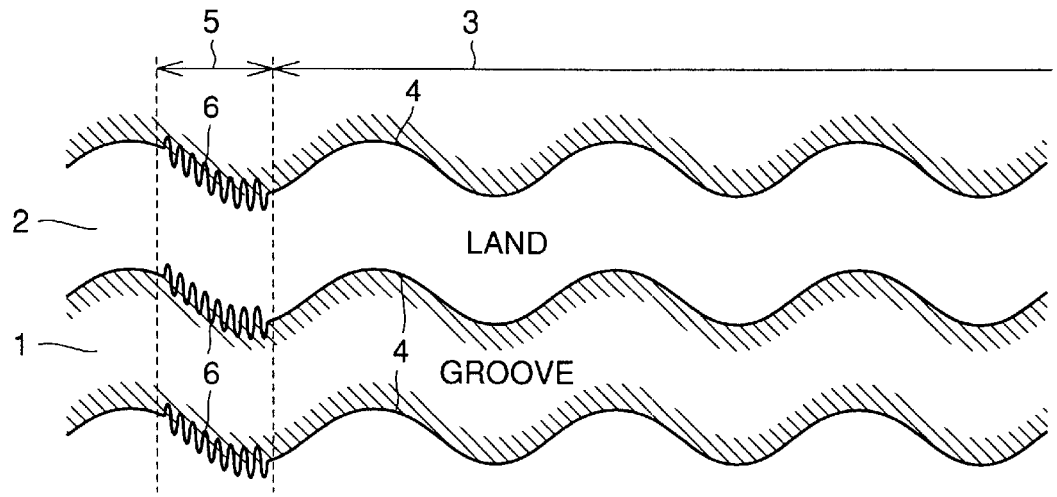
FIG. 1 is a plan view of the structure of a magneto-optical disc with a synchronous clock signal and an address for recording or reproducing recorded by wobbling a groove.

Embodiments of the present invention will be now described in detail in conjunction with the accompanying drawings, in which the same or corresponding portions are denoted with the same reference characters and not described.

First Embodiment

Before a magneto-optical disc recording/reproducing apparatus according to a first embodiment of the invention is described, the magneto-optical disc to/from which information is recorded/reproduced by this recording/ reproducing apparatus will be briefly described. Note that the magneto-optical disc is described in detail in the previously mentioned international application.

(1) Structure of Magneto-optical Disc

FIG. 1 is a plan view of the structure of a magneto-optical disc. As shown in FIG. 1, the magneto-optical disc has a groove 1 and a land 2 is formed between such grooves 2 adjacent to each other as a result. Groove 1 and land 2 form spiral or concentric tracks. In a data region 3 to record data, wobbles 4 are formed at prescribed intervals on both sidewalls of groove 1. In an address region 5 to record an address, wobbles 6 at prescribed intervals shorter than wobbles 4 are formed on both sidewalls of groove 1. Address region 5 is provided for each sector of the magneto-optical disc. The width of groove 1 is constant and the phases of wobbles 4 formed on both sidewalls are coincident.

Figure 2:
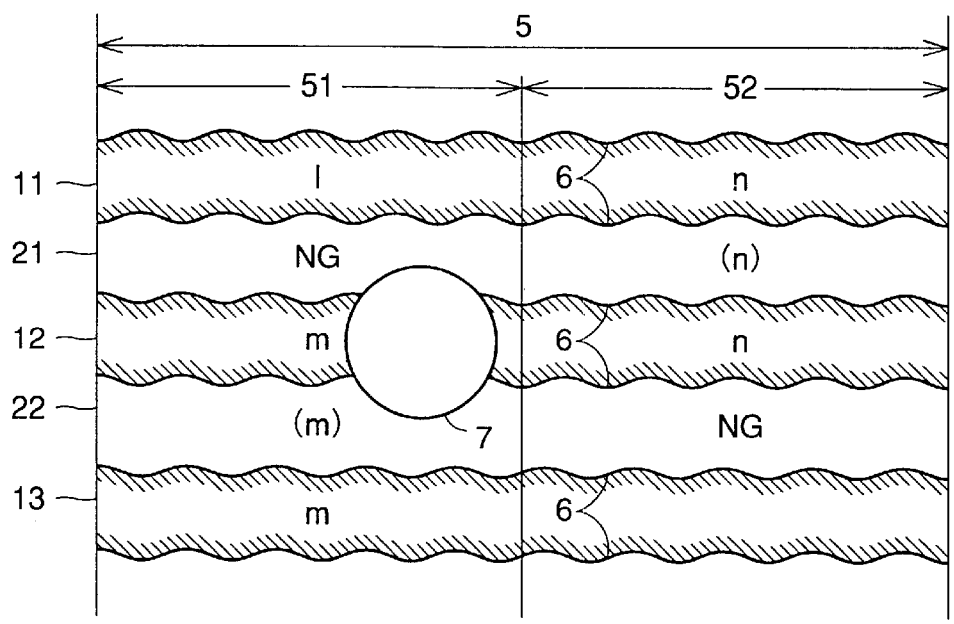
FIGS. 2 and 3 are plan views showing an address region in the magneto-optical disc in FIG. 1.
Figure 3:
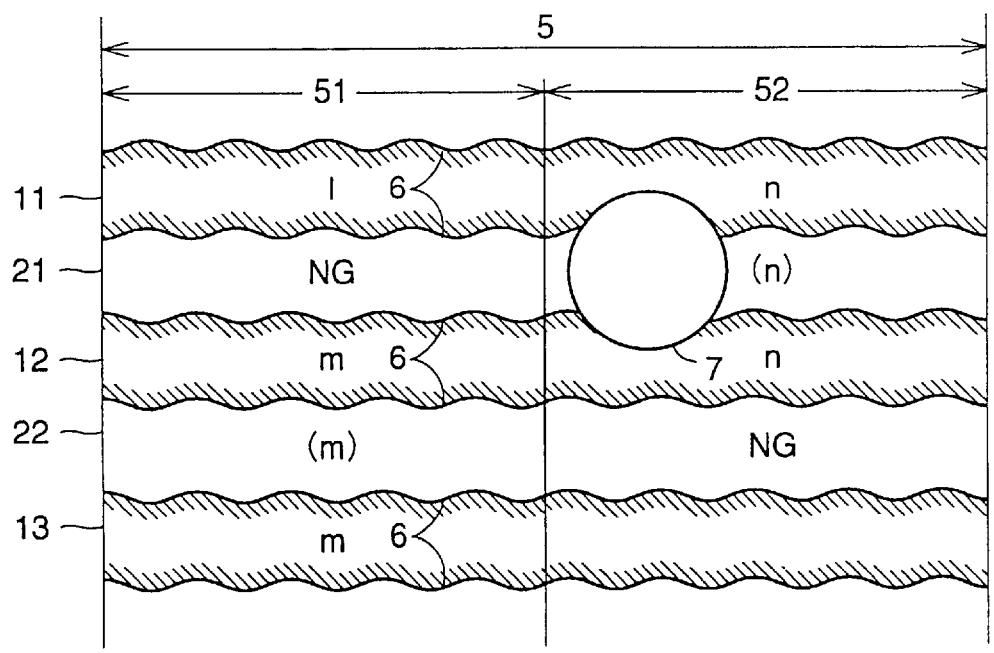

FIGS. 2 and 3 are enlarged plan views of the address region shown in FIG. 1. As shown in FIGS. 2 and 3, address region 5 is further divided into a prior address region 51 and a subsequent address region 52. Prior address region 51 in a groove 11 is recorded with address l by forming wobbles 6 on both sidewalls thereof and subsequent address region 52 is similarly recorded with address n. Prior address region 51 in groove 12 is recorded with address m and subsequent address region 52 is recorded with address n. Prior address region 51 in groove 13 is recorded with address m. Since a land cannot be wobbled, address (n) for a land 21 is recorded on grooves 11 and 12 on both sides. Similarly, address (m) for a land 22 is recorded on grooves 12 and 13 on both sides.

Therefore, if groove 12 is scanned with a light collected spot 7 as shown in FIG. 2, for example, two addresses m and n are read out for one piece of; data. As a result, one of these read addresses must be selected.

Groove 11 is scanned with beam spot 7, address l recorded in prior address region 51 is selected. When groove 12 is scanned with beam spot 7, address n recorded in subsequent address region 52 is selected. When land 21 is scanned with beam spot 7 as shown in FIG. 3, address (n) recorded in subsequent address region 52 is read out. Since addresses different from each other are recorded on grooves 11 and 12 on both sides of land 21, no address is read out from this region. When land 22 is scanned with beam spot 7, address (m) recorded in prior address region 51 is read out. Since addresses different from each other are recorded on grooves on both sides of land 22 in subsequent address region 52, no address is read out from this region either.

In a magneto-optical disc recorded with addresses by wobbling the grooves as described above, addresses for groove and land are both recorded in address region 5, it must be identified which one of addresses read out before and after is an address for groove when a groove is scanned with light collected spot 7, or to identify which one of the addresses read out before and after is an address for land when a land is scanned with light collected spot 7.

Figure 4:
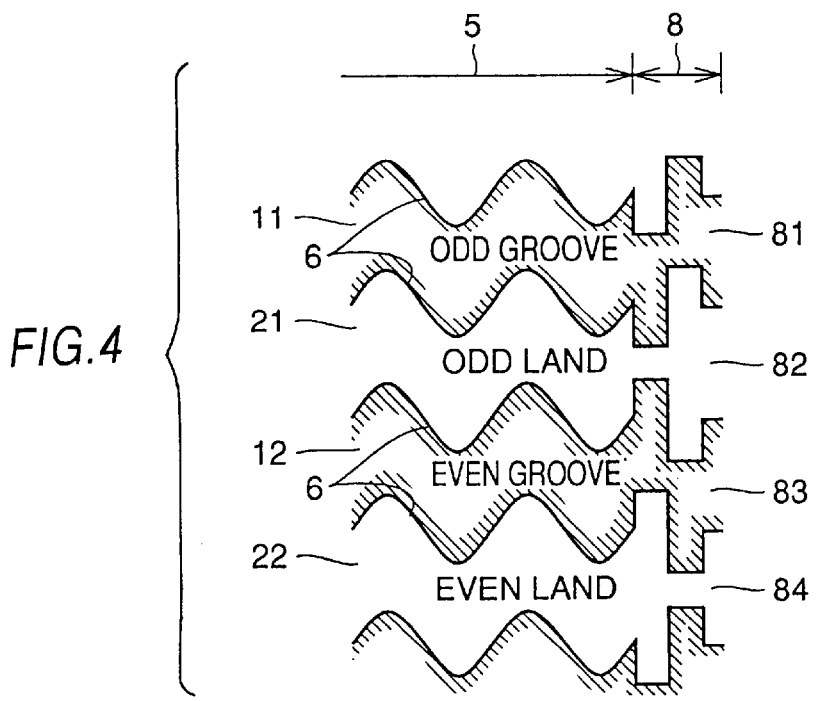
FIG. 4 is a plan view of the structure of an address mark region adjacent to the address region of the magneto-optical disc shown in FIG. 1.

Therefore, an address mark region 8 is provided adjacent to address region 5 as shown in FIG. 4. An address mark 81 is used to identify whether an address read out formally from address region 5 in an odd groove 11 is an address for groove or an address read out later is an address for groove. An address mark 82 is used to identify whether an address read out formally from address region 5 in an odd land 21 is an address for land or an address read out later is an address for land. An address mark 83 is used to identify whether an address read out formally from address region 5 in an even groove 12 is an address for groove or an address read out later is an address for land. An address mark 84 is used to identify whether an address read out formally from address region 5 in an even land 22 is an address for land or an address read out later is an address for land.

Herein, the address marks 81 and 83 of adjacent grooves 11 and 12 have shapes different from each other, for example, shapes in opposite phases. As a result, the address marks 82 and 84 of adjacent lands 21 and 22 also have different shapes, for example, shapes in opposite phases.

Therefore, address marks 81 to 84 permit an address to be selected, and a data signal starts to be recorded or reproduced in response to detection of address marks 81 to 84 in a magneto-optical disc recording/reproducing apparatus which will be described in detail.

Figure 5:
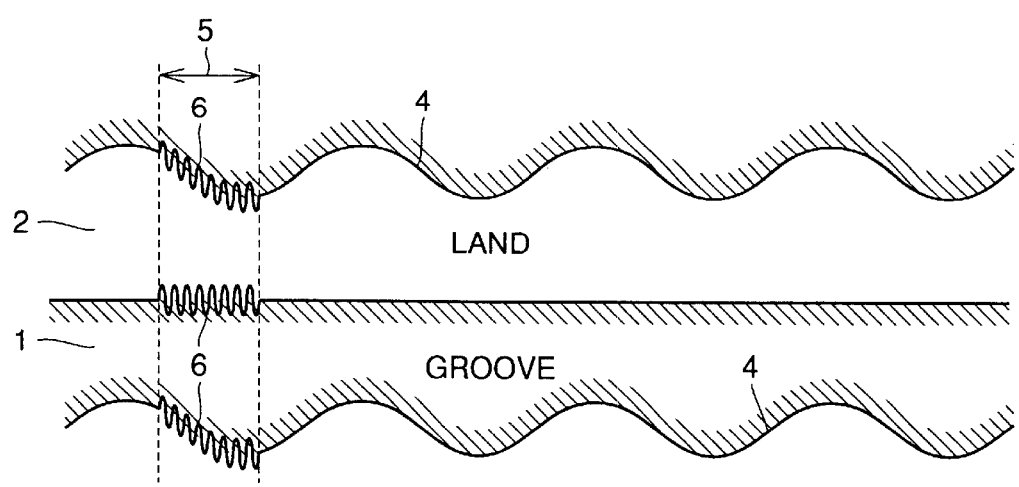
FIG. 5 is a plan view of the structure of another magneto-optical disc with a synchronous clock signal and an address for recording and reproducing recorded by wobbling a groove.

Note that in FIG. 1, wobbles 4 are formed on both sidewalls of groove 1, while wobble 4 may be formed only on one of the sidewalls of groove 1 as shown in FIG. 5. Therefore, wobble 4 needs only be formed on at least one of the sidewalls of groove 1. Even in this case, wobble 6 is formed on both sidewalls of groove 1 in address region 5.

(2) The Structure of Magneto-optical Disc Recording/Reproducing Apparatus

The structure of a magneto-optical disc recording/reproducing apparatus for recording/reproducing a data signal to/from the magneto optical disc will be now described.

Figure 6:
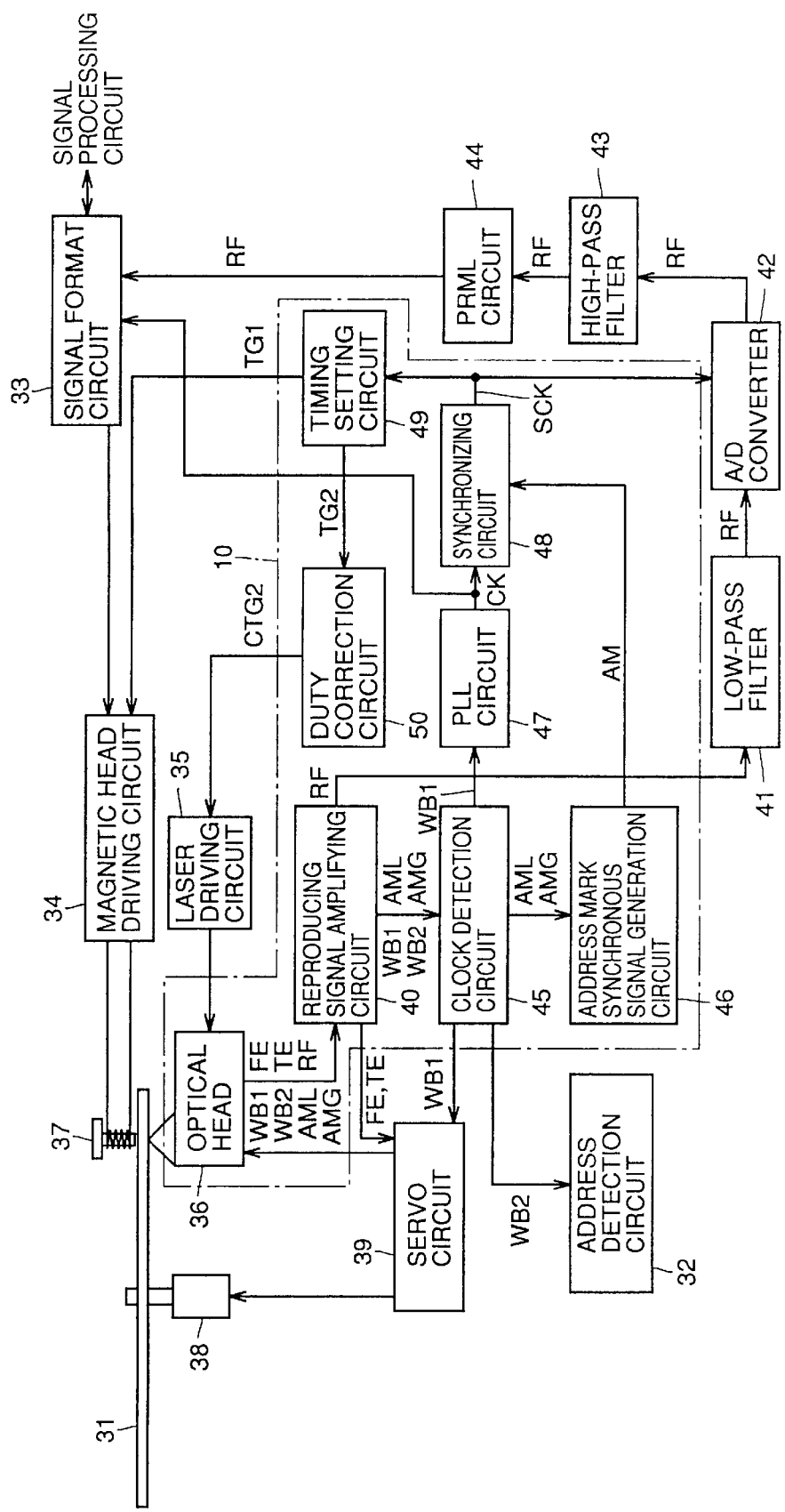
FIG. 6 is a block diagram of the general structure of a magneto-optical disc recording/reproducing apparatus according to a first embodiment of the present invention.

Referring to FIG. 6, the magneto-optical disc recording/reproducing apparatus includes a spindle motor 38 to rotate the magneto-optical disc 31, an optical head 36 to direct a laser beam to magneto-optical disc 31 and output a data signal RF, a focus error signal FE, a tracking error signal TE, wobble signals WB1 and WB2, and address mark signals AML and AMG, a magnetic head 37 to apply a magnetic field to magneto-optical disc 31, a laser driving circuit 35 to drive a semiconductor laser in optical head 36, a magnetic head driving circuit 34 to drive magnetic head 37, a signal format circuit 33 to format a data signal to be recorded and a reproduced data signals a reproduction signal amplifying circuit 40 to amplify signals RF, FE, TE, WB1, WB2, AML, and AMG output from optical head 36, a servo circuit 39 to perform servo-control of spindle motor 38 and focusing and tracking servo-control of optical head 36 in response to focus error signal FE and tracking error signal TE output from reproduction signal amplifying circuit 40, a low-pass filter 41 to transmit only a low band component of data signal RF output from reproducing signal amplifying circuit 40, an A/D converter 42 to A/D convert data signal RF transmitted through low-pass filter 41, a high-pass filter 43 to transmit only a high band component of data signal RF output from A/D converter 42, and a PRML (Partial Response Maximum Likelihood) circuit 44 to perform three-value determination of data signal RF transmitted through high-pass filter 43.

The magneto-optical disc recording/reproducing apparatus further includes a clock detection circuit 45 to detect wobble signals WB1 and WB2 among signals FE, WB1, WB2, AML and AMG output from reproduction signal amplifying circuit 40, an address mark synchronous signal generation circuit 46 to generate an address mark synchronous signal AM in synchronization with address marks 81 to 84 in response to address mark signals AML and AMG output from a clock detection circuit 45, a phase flocked loop (PLL) circuit 47 to generate a clock signal CK in synchronization with a wobble 4 in response to wobble signal WB1 output from clock detection circuit 45, a synchronizing circuit 48 to synchronize clock signal CK output from PLL circuit 47 with address mark synchronous signal AM and generate a synchronized clock signal SCK, a timing setting circuit 49 to generate timing pulse signals TG1 and TG2 in response to synchronized clock signal SCK output from synchronizing circuit 48, a duty correction circuit 50 to correct the duty of timing pulse signal TG2 output from timing setting circuit 49 and generate a corrected timing pulse signal CTG2 and an address detection circuit 32 to detect an address in response to wobble signal WB2 output from clock detection circuit 45.

Herein, optical head 36, reproducing signal amplifying circuit 40, clock detection circuit 45, address mark synchronous signal generation circuit 146, PRML circuit 47, synchronizing circuit 48, timing setting circuit 49 and duty correction circuit 50 form a detection circuit 10 to detect address marks 81 to 84 and wobbles 4 and 6.

1) The Structure of Optical Head 36

Figure 7:
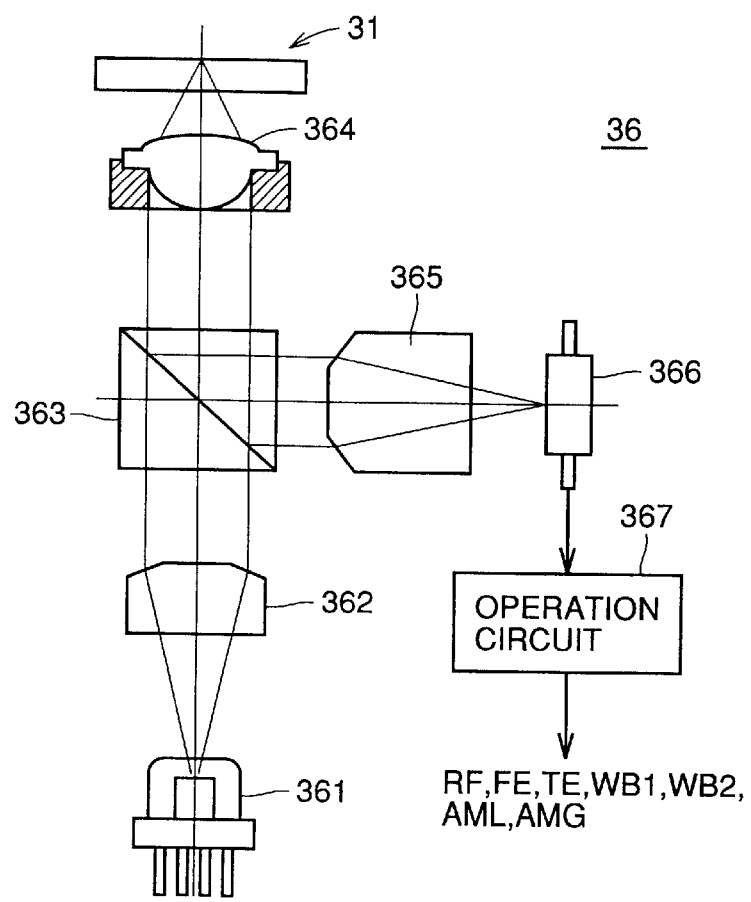
FIG. 7 is a view of an optical head in the magneto-optical disc recording/reproducing apparatus shown in FIG. 6.

As shown in FIG. 7, optical head 36 includes a semiconductor laser 361 to emit a laser beam of a wavelength of 650 nm (tolerance ±15), a collimator lens 362 to collimate a laser beam from semiconductor laser 361, a beam splitter 363 to transmit a laser beam from collimator lens 362 and reflect a laser beam reflected from magneto-optical disc 31 at 90°, an objective lens 364 to bring into focus a laser beam transmitted through beam splitter 363 on magneto-optical disc 31, a light collecting lens 365 to collect light from a laser beam from beam splitter 363, a photodetector 366 to detect a laser beam for light collecting lens 365, and an operation circuit 367 to perform a prescribed operation based on a detection signal from photodetector 366.

(2.1.1) The Structure of Photodetector 366

Figure 8:
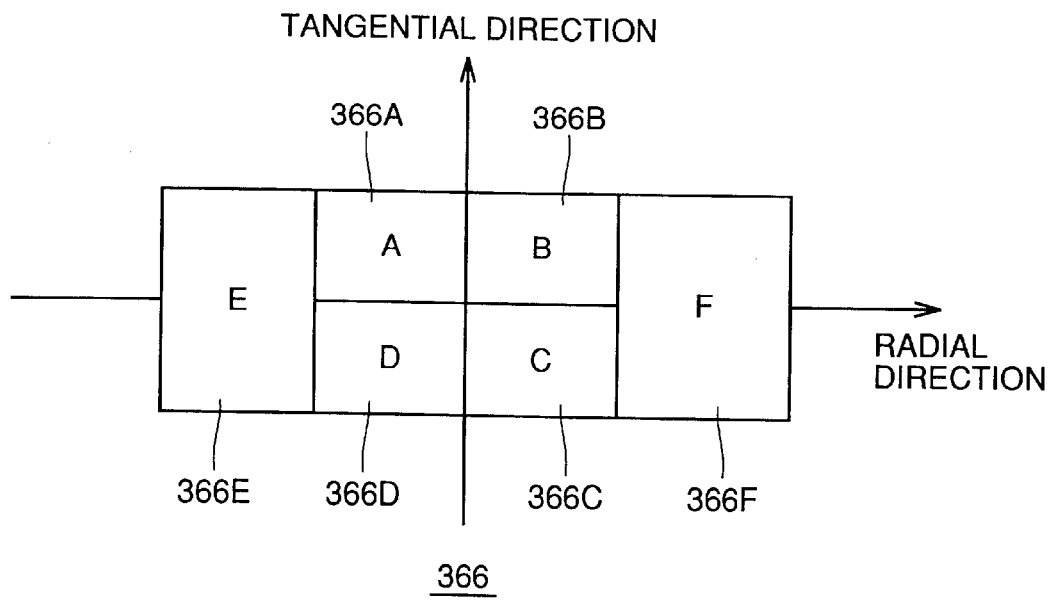
FIG. 8 is a plan view of a photodetector in the optical head in FIG. 7.

Photodetector 366 is divided into 6 sensors 366A, 366B, 366C, 366D, 366E, and 366F as shown in FIG. 8. Photodetector 366 has its longer-side direction arranged along the radial direction (the direction perpendicular to the track), and its shorter-side direction arranged along the tangential direction (the tangential direction to the track). A laser beam reflected from magneto-optical disc 31 is reflected upon beam splitter 363, and the reflected laser beam is divided into three beams by a Wollaston prism (not shown). The central beam among the three beams is detected by sensors 366A, 366B, 366C and 366D.

Operation circuit 367 performs operations represented by the following expressions (1) to (4):

$$(WB1 \text{ or } WB2 \text{ or } AMG) + TE = (A+D) - (B+C) \tag{1}$$

$$FE = (A+C) - (B+D) \tag{2}$$

$$AML = (A+C) + (B+D) \tag{3}$$

$$RF = E - F \tag{4}$$

wherein WB1 and WB2 represent wobble signals. AMG represents an address mark signal for groove. TE represents a tracking error signal. FE represents a focus error signal. AML represents an address mark signal for land. RF represents a data signal.

(2.2) The Structure of Address Mark Synchronous Signal Generation Circuit 46

Figure 9:
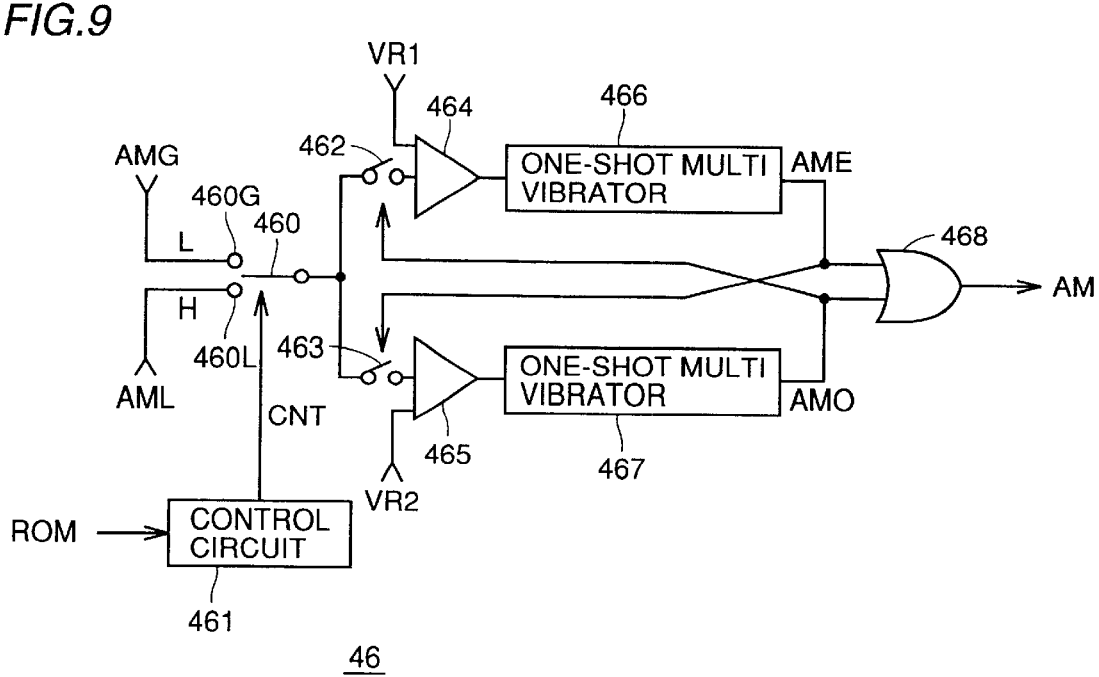
FIG. 9 is a block diagram of the configuration of an address mark synchronous signal generation circuit in the magneto-optical disc recording/reproducing apparatus shown in FIG. 6.

As shown in FIG. 9, address mark synchronous signal generation circuit 46 includes a switching element 460, a control circuit 461 to generate a control signal CNT to control switching element 460, a switching element 462 connected in series with switching element 460, a switching element 463 connected in series with switching element 460, a comparator 464 to compare the level of address mark signal AMG or AML input through switching element 462 to a reference level VR1, a comparator 465 to compare address mark signal AMG or AML input through switching element 463 to a reference level VR2, a one-shot multi vibrator 466 to generate an even address mark synchronous signal AME in response to the output signal of comparator 464, a one-shot pulse multi vibrator 467 to generate an odd address mark synchronous signal AMO in response to the output signal of comparator 465, and an OR circuit 468 to generate an address mark synchronous signal AM in response to even address mark synchronous signal AME and odd address mark synchronous signal AMO.

Optical head 36 described above scans a groove 1 or a land 2 with a laser beam according to a program pre-stored on a ROM (not shown). Control circuit 461 pulls control signal CNT to an L level in response to a groove scanning instruction from the ROM and pulls CNT to an H level in response to a land scanning instruction. Switching element 460 is switched to the side of a terminal 460G which receives groove address mark signal AMG in response to L level control signal CNT, and is switched to the side of a terminal 460L which receives land address mark signal AML in response to H level control signal CNT. Switching element 462 is turned on in response to L level, odd address mark synchronous signal AMO, and turned off in response to H level, odd address mark synchronous signal AMO. Switching element 463 is turned on in response to L level, even address mark synchronous signal AME and is turned off in response to H level, even address mark synchronous signal AME.

(3) Recording Operation

The recording operation of the magneto-optical disc recording/reproducing apparatus thus structured will be now described.

Referring to FIG. 6, a laser beam is directed upon magneto-optical disc 31 from optical head 36, and wobbles 4 and 6 and address marks 81 to 84 shown in FIG. 1 are detected. Thus, wobble signal WB1 is output from optical ahead 36 based on detected wobble 4, wobble signal WB2 based on detected wobble 6, and address mark signals AML and AMG based on detected address marks 81 to 84. In addition, focus error signal FE and tracking error signal TE are output.

These signals WB1, WB2, AML, AMG, FE, and TE are supplied to reproduction signal amplifying circuit 40, amplified therein, and focus error signal FE and tracking error signal TE are supplied to servo circuit 39, while wobble signals WB1 and WB2 and address mark signals AML and AMG are supplied to clock detection circuit 45.

A method of detecting these signals WB1, WB2, AML, AMG, FE and TE will be now described in detail in conjunction with FIGS. 7 and 8.

A laser beam reflected from magneto-optical disc 31 is divided into three by a Wollaston prism and then input to photodetector 366, and the central beam among the three beams are detected by sensors 366A, 366B, 366C and 355D.

Operation circuit 367 performs an operation represented by the above expression (1) to generate a combined signal (WB1+TE) or (WB2+TE) or (AMG+TE). When a laser beam is directed upon groove 1 in a data region 3, combined signal (WB1+TE) is generated, when a laser beam is directed upon groove 1 in an address region 5, combined signal (WB2+TE) is generated and when a laser beam is directed upon a groove in an address mark region 8, combined signal (AMG+TE) is generated.

Operation circuit 367 also performs an operation represented by the above expression (2) to generate focus error signal FE. Operation circuit 367 further performs an operation represented by the above expression (3) to generate land address mark signal AML.

Figure 10A:
FIGS. 10A to 10D are diagrams showing address marks and address mark signals generated based on the address marks.
Figure 10B:
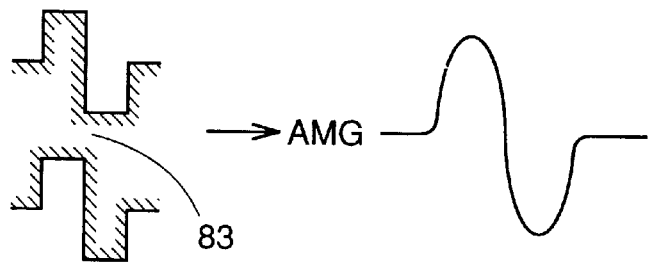
Figure 10C:
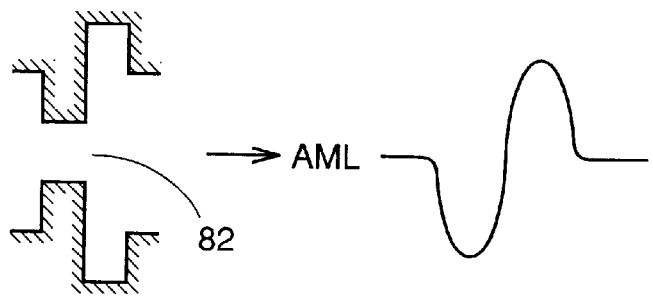
Figure 10D:
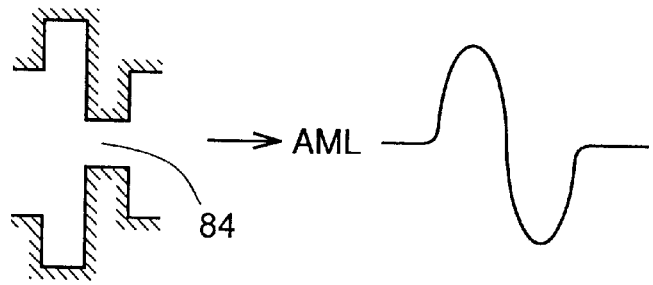

Therefore, as shown in FIG. 10A, when address mark 81 in an odd groove is scanned with a laser beam, groove address mark signal AMG which falls and then rises is generated. As shown in FIG. 10B, when address mark 83 in an even groove is scanned with a laser beam, groove address mark signal AMG which rises and then falls is generated. As shown in FIG. 10C, when address mark 82 in an odd land is scanned with a laser beam, land address mark signal AML which falls and then rises is generated. As shown in FIG. 10D, when address mark 84 in an even land is scanned with a laser beam, land address mark AML which rises and then falls is generated.

Figure 11A:
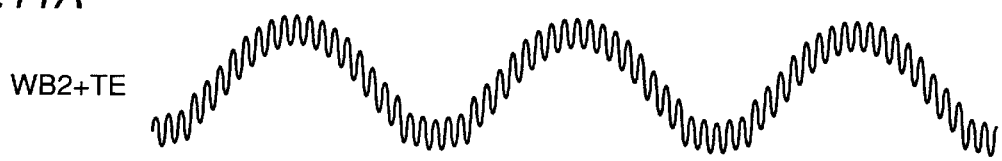
FIGS. 11A to 11D are timing charts for use in illustration of the operation of a clock detection circuit and a PLL circuit in the magneto-optical disc recording/reproducing apparatus shown in FIG. 6.

As described above, wobble signal WB1, wobble signal WB2 or groove address signal AMG is detected together with tracking error signal TE, a combined signal of wobble signal WB2 and tracking error signal TE takes for example a waveform as shown in FIG. 11A.

In reproduction signal amplifying circuit 40, a combined signal as shown in FIG. 11A is divided into a high frequency component and a low frequency component. The high frequency component includes wobble signal WB1, wobble signal WB2 or groove address mark signal AMG. The low frequency component includes tracking error signal TE.

Wobble signals WB1 and WB2 and groove address mark signal AMG are supplied to clock detection circuit 45 and tracking error signal TE is supplied to servo circuit 39. Focus error signal FE is supplied to serve circuit 39 and land address mark signal AML is supplied to clock detection circuit 145.

Clock detection circuit 45 supplies wobble signal WB1 to PLL circuit 47 and servo circuit 39, land address mark signal AML and groove address mark signal AMG to address mark synchronous signal generation circuit 46, and wobble signal WB2 to address detection circuit 32.

Servo circuit 39 rotates spindle motor 38 in synchronization with supplied wobble signal WB1 at a prescribed revolution, and controls objective lens 364 in optical head 36 in response to tracking error signal TE and focus error signal FE for tracking servo and focusing servo operation.

Figure 11B:
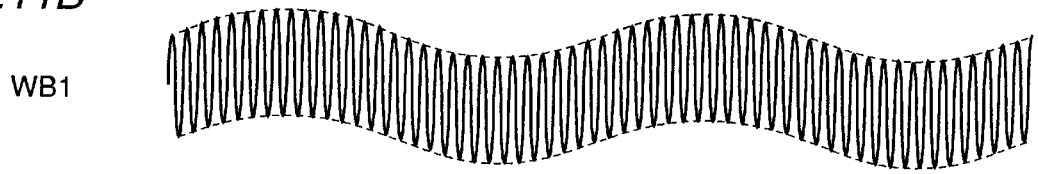
Figure 11C:
Figure 11D:

PLL circuit 47 digitizes wobble signal WB1 as shown in FIG. 11B supplied from clock detection circuit 45 to generate digitized wobble signal DWB1 as shown in FIG. 11C. PLL circuit 47 also generates a clock signal CK as shown in FIG. 11D which is in synchronization with digitized wobble signal DWB1. PLL circuit 47 supplies this clock signal CK to synchronizing circuit 48 and signal format circuit 33.

When odd groove 11 is scanned with a laser beam according to an instruction from the ROM, control circuit 461 shown in FIG. 9 pulls a control signal CLT to an L level as shown in FIG. 12B. Thus, switching element 460 is switched to the side of a terminal 460G, and a groove address mark signal AMG as shown in FIG. 12C is selected.

Initially, odd address mark synchronous signal AMO and even address mark synchronous signal AME are both at an L level, switching elements 462 and 463 are both in an on state. Thus, groove address signal AMG is supplied to comparator 464 through a switching element 462, and to comparator 465 through switching element 463.

When address mark 81 in an odd groove as shown in FIG. 12A is detected, groove address mark signal AMG which falls and then rises is supplied first.

Therefore, the level of groove address mark signal AMG reaches a reference level VR2 before reaching reference level VR1. When groove address mark signal AMG attains reference level VR2, odd address mark synchronous signal AMO which is at an H level for a prescribed time period is generated as shown in FIG. 12E by one-shot multi vibrator 467 in response to an output signal from comparator 465. Switching element 462 is turned off in response to this H level, odd address mark synchronous signal AMO, even address mark synchronous signal AME will not attain an H level if groove address mark signal AMG attains reference level VR1 as shown in FIG. 12F. Therefore, odd address mark synchronous signal AMO is output as address mark synchronous signal AM through OR circuit 468 as shown in FIG. 12G. During the period in which even groove 11 is scanned with a laser beam, the above-described operation is repeated.

Then, when an odd land 21 is scanned with a laser beam in response to an instruction from the ROM, control circuit 461 pulls control signal CNT to an H level as shown in FIG. 12B. In response to this H level, control signal CNT, switching element 460 is switched to the side of terminal 460L. Therefore, land address mark signal AML is supplied to comparator 464 through switching elements 460 and 462 and to comparator 465 through switching elements 460 and 463. When address mark 82 in an odd land as shown in is shown in FIG. 12A is scanned with a laser beam, address mark synchronous signal AML falls and then rises as shown in FIG. 12D. Therefore, similarly to the case of the above odd groove, the level of land address mark signal AML reaches the level of reference level VR2 before reaching reference level VR1, and therefore odd address mark synchronous signal AMO is at an H level in a prescribed time period, but even address mark synchronous signal AME will not attain an H level. As a result, H level, odd address mark synchronous signal AMO is output as address mark synchronous signal AM through OR circuit 468.

Then, even groove 12 is scanned with a laser beam in response to an instruction from the ROM, control circuit 461 pulls control signal CNT to an L level. In response to this L level, control signal CNT, switching element 460 is switched to the side of terminal 460G, and thus groove address mark signal AMG is applied to comparator 464 through switching elements 460 and 462, and to comparator 465 through switching elements 460 and 463.

When address mark 83 in an even groove as shown in FIG. 12A is irradiated with a laser beam, the level of groove address mark signal AMG rises and then falls. Thus, the level of groove address mark signal AMG reaches reference level VR1 before reaching reference level VR2, and therefore, when the level of address mark signal AMG reaches VR1, even address mark synchronous signal AME from one-shot multi vibrator 466 attains an H level for a prescribed time period. In response to this H level even address mark synchronous signal, switching element 463 is turned off, odd address mark synchronous signal AMO from one-shot multi vibrator 467 will not attain an H level. As a result, this H level, even address mark synchronous signal AME is output as address mark synchronous signal AM through OR circuit 468.

Then, when even land 22 is scanned with a laser beam in response to an instruction from the ROM, H level control signal CNT is output from control circuit 461. In response to this H level control signal CNT, switching element 460 is switched to the side of terminal 460L, which allows land address mark signal AML to be supplied to comparator 464 trough switching elements 460 and 462 and to comparator 465 through switching elements 460 and 463.

When address mark 84 in an even land as shown in FIG. 12A is detected, the level of land address mark signal AML rises and then falls. Since the level of land address mark signal AML reaches reference level VR1 before reaching reference level VR2, even address mark synchronous signal AME output from one-shot multi vibrator 466 when the level of land address mark signal AML reaches reference level VR1 attains an H level. This H level even address mark synchronous signal AME is output as address mark synchronous signal AM through OR circuit 468.

Address mark synchronous signal AM as shown in FIG. 12G generated by address mark synchronizing generation circuit 46 is supplied to synchronizing circuit 48.

In synchronizing circuit 48, clock signal CK supplied from PLL circuit 47 is synchronized with address mark synchronous signal AM. More specifically, clock signal CK is output as a synchronized clock signal SCK for each of pulse signals AM1, AM2, AM3, . . . , AMn. For example, simultaneously with a rising of pulse signal AM1, clock signal CK is output as synchronized clock signal SCK as shown in FIG. 13B. Also, simultaneously with a rising of pulse signal AM2, clock signal CK is output as a synchronized clock signal SCK as shown in FIG. 13C.

Synchronized clock signal SCK as shown in FIGS. 13B and 13C synchronized by synchronizing circuit 48 is supplied to timing setting circuit 49.

Timing setting circuit 49 generates a timing pulse signal TG1 as shown in FIG. 13D and a timing pulse signal TG2 as shown in FIG. 13E. Timing pulse signal TG1 is a signal to determine a switching timing of an alternate magnetic field applied to magneto-optical disc 31 from magnetic head 37. Timing pulse signal TG2 is a signal to determine an irradiation timing of a laser beam to be directed to magneto-optical disc 31 from semiconductor laser 361 included in optical head 36. Timing pulse signals TG1 and TG2 are generated based on synchronized clock signal SCK supplied from synchronizing circuit 48.

Timing pulse signal TG1 is supplied to magnetic head driving circuit 34, while timing pulse signal TG2 is supplied to duty correction circuit 50. Herein, before timing pulse signal TG1 attains a high level and then a low level, timing pulse signal TG2 is activated. Therefore, if the direction of the magnetic field is inverted, a laser beam will not be irradiated. This is because a prescribed transition time is necessary for the direction of the magnetic field to be inverted, and a data signal cannot be accurately recorded if magneto-optical disc 31 is irradiated with a laser beam during this inversion of the direction of the magnetic field.

In signal format circuit 33, a data signal to be recorded in synchronization with clock signal CK supplied from PLL circuit 33 is formatted and supplied to magnetic head driving circuit 34. In magnetic head driving circuit 34, the OR of timing pulse signal TG1 supplied from timing setting circuit 49 and the data signal supplied from signal format circuit 33 is operated, magnetic head 37 is driven based on the result of operation, and the data signal is recorded on magneto-optical disc 31.

In duty correction circuit 50, the duty ratio of timing pulse signal TG2 supplied from timing setting circuit 49 (which determines the on/off period of semiconductor laser 361) is corrected, and the corrected timing pulse signal CTG2 is supplied to laser driving circuit 35. Laser driving circuit 35 drives semiconductor laser 361 included in optical head 36 in response to corrected timing pulse signal CTG2 supplied from duty correction circuit 50, and a pulsed laser beam is directed to magneto-optical disc 31 as a result.

As in the foregoing, this magneto-optical disc recording/reproducing apparatus can record a data signal on magneto-optical disc 31 in synchronization with address marks 81 to 84 recorded on magneto-optical disc 31.

(4) Reproducing Operation

The reproducing operation of the magneto-optical disc recording/reproducing apparatus will be now described.

Similarly to the above recording operation in which a laser beam is directed on magneto-optical disc 31 from optical head 36, wobbles 4 and 6 shown in FIG. 1 and address marks 81 to 84 shown in FIG. 4 are detected. Thus, wobble signals WB1, WB2, address mark signals AML, AMG, data signal RF, focus error signal FE and tracking error signal TE are output from optical head 36 to reproduction signal amplifying circuit 40 and amplified therein, and focus error signal FE and tracking error signal TE are supplied to servo circuit 39, while data signal RF is supplied to low-pass filter 41. Wobble signals WB1, WB2 and address mark signals AML, AMG are supplied to clock detection circuit 45. Wobble signal WB1 is supplied to PLL circuit 47 and servo circuit 39 from clock detection circuit 45, address mark signals AML, AMG are supplied to address mark synchronous signal generation circuit 46 and wobble signal WB2 is supplied to address detection circuit 32.

In optical head 36, a laser beam reflected from magneto-optical disc 31 is divided into three by a Wollaston prism as described above, and the beams on both sides of the three beams are detected by sensors 366E and 366F shown in FIG. 8, respectively. Operation circuit 367 shown in FIG. 7 performs an operation represented by the above expression (4) based on signals E and F detected by sensors 366 E and 366F and generates data signal RF.

In PLL circuit 47, similarly to the above-described recording operation, clock signal CK in synchronization with wobble 4 is generated in response to wobble signal WB1 supplied from clock detection circuit 45 and supplied to synchronizing circuit 48. In address mark synchronous signal generation circuit 46, similarly to the above-described recording operation, address mark synchronous signal AM in synchronization with address marks 81 to 84 is generated in response to address mark signals AML and AMG supplied from the clock detection circuit and supplied to synchronizing circuit 48.

In synchronizing circuit 48, similarly to the above-described recording operation, clock signal CK supplied from PLL circuit 47 is synchronized with address mark synchronous signal AM supplied from address mark synchronous signal generation circuit 46. Synchronized clock signal SCK output from synchronizing circuit 48 is supplied to timing setting circuit 49 and A/D converter 42.

Since a magnetic field is not applied to magneto-optical disc 31 from magnetic head 37, a timing pulse signal TG2 is generated in response to synchronized clock signal SCK supplied from synchronizing circuit 48 in timing setting circuit 49, and supplied to duty correction circuit 50. This timing pulse signal TG2 is the same as that shown in FIG. 13E.

In duty correction circuit 50, similarly to the above-described recording operation, the duty ratio of timing pulse signal TG2 supplied from timing setting circuit 49 is corrected, and the corrected timing pulse signal CTG2 is supplied to laser driving circuit 35. Laser driving circuit 35 drives semiconductor laser 361 included in optical head 36 in response to the supplied corrected timing pulse signal CTG2, and a pulsed laser beam is directed upon magneto-optical disc 31 as a result.

In low pass filter 41, data signal RF supplied from reproducing signal amplifying circuit 40 is removed of high frequency noise and supplied to A/D converter 42. In A/D converter 42, the signal is subjected to A/D conversion in synchronization with synchronized clock signal SCK supplied from synchronizing circuit 48, and A/D converted data signal RF is supplied to high-pass filter 43. In high-pass filter 43, low frequency noise caused for example by birefringence in magneto-optical disc 31 is removed, and data signal RF is supplied to PRML circuit 44. In PRML circuit 44, data signal RF is subjected to three-value determination, and data signal RF is demodulated with errors being suppressed.

Since address marks 81 to 84 are each present in a single sector, if a signal is recorded or reproduced for a long period of time and across a large number of sectors as in the case of magneto-optical discs for audio/video, a recording-related or reproduction-related operation needs only be started in synchronization with the first address mark recorded on magneto-optical disc 31 and stopped in synchronization with the last address mark.

Synchronized clock signal SCK from synchronizing circuit 48 may be directly supplied to magnetic head driving circuit 34 and laser driving circuit 35 without using timing setting circuit 49 shown in FIG. 6.

As in the foregoing, the magneto-optical disc recording/reproducing apparatus can reproduce a data signal recorded on magneto-optical disc 31 in synchronization with an address mark recorded on magneto-optical disc 31.

Second Embodiment

Figure 14:
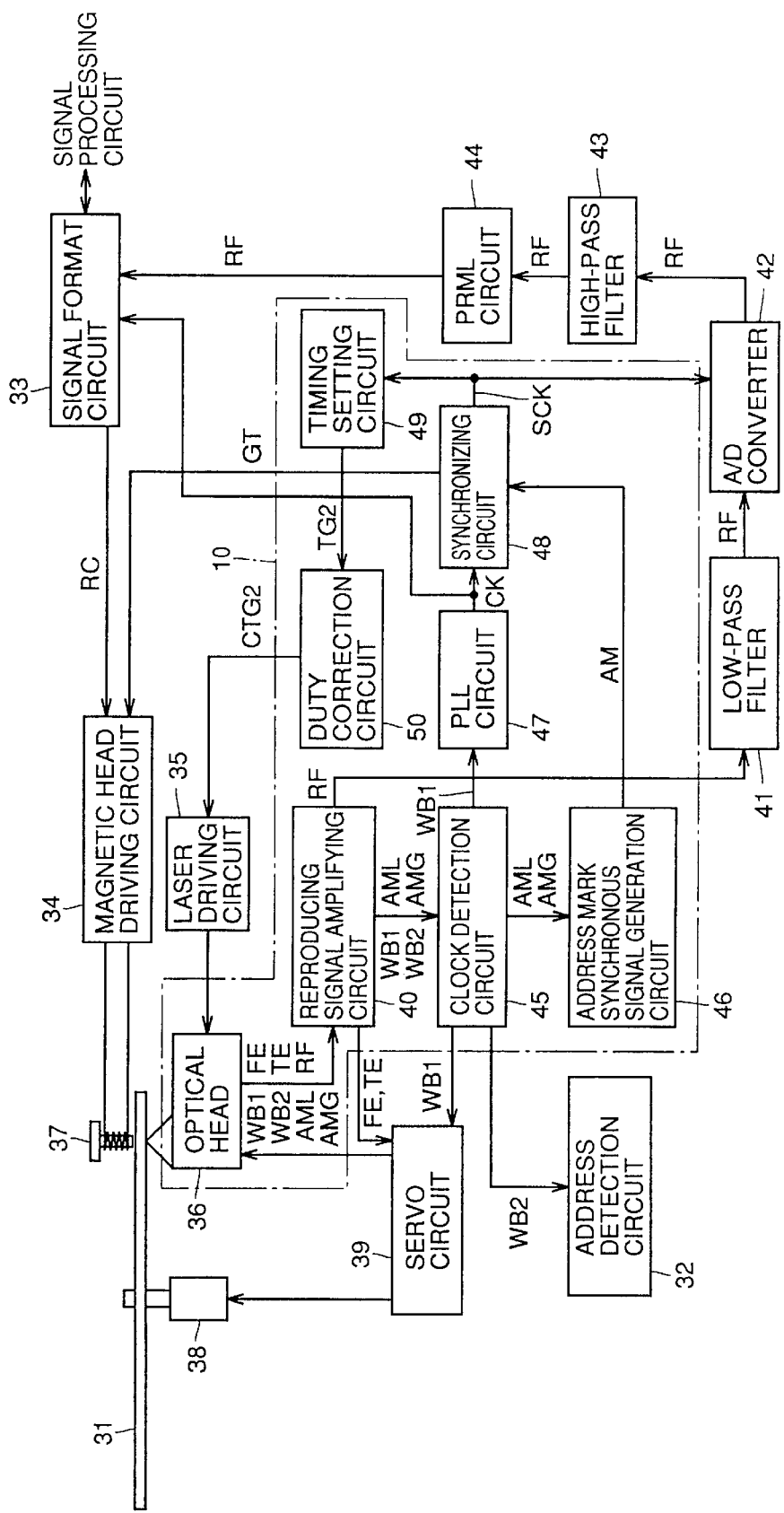
FIG. 14 is a block diagram of the general structure a magneto-optical disc recording/reproducing apparatus according to a second embodiment of the present invention.

As shown in FIG. 14, a magneto-optical disc recording/reproducing apparatus according to a second embodiment of the present invention has substantially the same structure as that shown in FIG. 6. The second embodiment is different from the first embodiment in that a gate signal GT output from synchronizing circuit 48 is used as a signal to control magnetic head driving circuit 34. More specifically, in the apparatus shown in FIG. 6, timing pulse signal TG1 is supplied from timing setting circuit 49 to magnetic head driving circuit 34, while gate signal GT is supplied from synchronizing circuit 48 to magnetic head driving circuit 34 as a timing pulse signal to control magnetic head driving circuit 34 in the apparatus shown in FIG. 14.

In synchronizing circuit 48, as shown in FIGS. 15A, 15B and 15C, synchronized clock signal SCK is generated similarly to the first embodiment, and gate signal GT is generated for each of timing pulses AM1, AM2, AM3, . . . , and AMn in address mark synchronous signal AM as shown in FIG. 15A and 15D and supplied to magnetic head driving circuit 34.

Timing setting circuit 49, duty correction circuit 50 and laser driving circuit 35 operate similarly to the first embodiment described above.

In magnetic head driving circuit 34, formatted data signal RC from signal format circuit 33 is synchronized with gate signal GT and magnetic head 37 records data signal RC on magneto-optical disc 31 in response to this synchronized data signal. The other operation is the same as that of the first embodiment.

Note that in connection with the above described embodiments, recording/reproducing apparatuses for magneto-optical disc are described by way of illustration, but the present invention is applicable to a recording/reproducing apparatus for a phase transition disc, dye or metal type write-once optical disc. Furthermore, the present invention is applicable to a recording/reproducing apparatus for an optical disc having address marks recorded in the form of pits. The present invention is also applicable to a recording/reproducing apparatus for various recording medium other than an optical disc. In the case of the magneto-optical disc, the present invention is applicable to a type of magneto-optical disc in which the magnetic domain of a signal recorded in a recording layer is transferred and expanded on a reproducing layer to reproduce the signal.

What is claimed is:

1. An information recording apparatus to record information on a recording medium recorded with an address mark to identify which of two addresses is an address for groove or land, comprising:
    a detector disposed to detect said address mark; and
    a recorder disposed to record said information on said recording medium in synchronization with said detected address mark;
    wherein said detector includes,
        an optical head including a laser disposed to direct a beam upon said recording medium and outputting an address mark signal in response to said address mark; and
        an address mark synchronous signal generator disposed to generate an address mark synchronous signal in synchronization with said address mark in response to said address mark signal,
    said recorder includes,
        a magnetic head;

a magnetic head driving circuit disposed to drive said magnetic head in synchronization with said address mark synchronous signal; and a laser driving circuit disposed to drive said laser in synchronization with said address mark synchronous signal; and wherein said address mark is recorded by forming a wobble on at least one of sidewalls of a groove, said optical head outputs a wobble signal in response to said wobble, said detector further includes a phase synchronizing circuit disposed to generate a clock signal in synchronization with said wobble in response to said wobble signal; and a synchronizing circuit disposed to synchronize said clock signal with said address mark synchronous signal, said magnetic head driving circuit drives said magnetic head in response to said synchronized clock signal, and said laser driving circuit drives said laser in response to said synchronized clock signal.

2. The information recording apparatus according to claim 1, wherein said detector further includes, a timing pulse signal generator disposed to generate a first timing pulse signal alternately changing between a first level and a second level higher than the first level, and a second timing pulse signal activated after said first timing pulse signal changes to said first level before said first timing pulse signal changes to said second level or after said first timing pulse signal changes to said second level before said first timing pulse signal changes to said first level, in response to said synchronized clock signal, said magnetic head driving circuit drives said magnetic head in response to said first timing pulse signal, and said laser driving circuit drives said laser in response to said second timing pulse signal.

3. The information recording apparatus according to claim 2, further comprising a duty correction circuit disposed to correct a duty of said second timing pulse signal.

4. The information recording apparatus according to claim 1, wherein said synchronizing circuit supplies said synchronized clock signal directly to said magnetic head driving circuit.

5. An information recording apparatus to record information on a recording medium recorded with an address mark to identify which of two addresses is an address for groove or land, comprising:

a detector disposed to detect said address mark; and a recorder disposed to record said information on said recording medium in synchronization with said detected address mark;

wherein said detector includes, an optical head including a laser disposed to direct a beam upon said recording medium and outputting an address mark signal in response to said address mark; and an address mark synchronous signal generator disposed to generate an address mark synchronous signal in synchronization with said address mark in response to said address mark signal, said recorder includes, a magnetic head;

a magnetic head driving circuit disposed to drive said magnetic head in synchronization with said address mark synchronous signal; and a laser driving circuit disposed to drive said laser in synchronization with said address mark synchronous signal; and wherein said address mark synchronous signal generator includes, a first comparator disposed to compare the level of said address mark signal with a first reference level when said laser directs a beam upon an odd groove or land in said recording medium and generate said address mark synchronous signal when the level of said address mark signal reaches said first reference level, and a second comparator disposed to compare the level of said address mark signal with a second reference level different from said first reference level when said laser directs a beam upon an even groove or land in said recording medium and generate said address mark synchronous signal when the level of said address mark signal reaches the second reference level.

6. An information recording apparatus to record information on a recording medium recorded with an address mark to identify which of two addresses is an address for groove or land, comprising:

a detector disposed to detect said address mark; and a recorder disposed to record said information on said recording medium in synchronization with said detected address mark;

wherein said detector includes, an optical head including a laser disposed to direct a beam upon said recording medium and outputting an address mark signal in response to said address mark; and an address mark synchronous signal generator disposed to generate an address mark synchronous signal in synchronization with said address mark in response to said address mark signal, said recorder includes, a magnetic head;

a magnetic head driving circuit disposed to drive said magnetic head in synchronization with said address mark synchronous signal; and a laser driving circuit disposed to drive said laser in synchronization with said address mark synchronous signal; and wherein said address mark synchronous signal generator includes, a first comparator disposed to compare the level of said address mark signal with a first reference level and generate said address mark synchronous signal when the level of said address mark signal reaches said first reference level, and a second comparator disposed to compare the level of said address mark signal with a second reference level different from said first reference level and generate said address mark synchronous signal when the level of said address mark signal reaches said second reference level, said first comparator inactivating said second comparator when the level of said address mark signal reaches said first reference level, said second comparator inactivating said first comparator when the level of said address mark signal reaches said second reference level.

7. An information reproducing apparatus to reproduce information from a recording medium recorded with an address mark to identify which of two addresses is an address for groove or land, comprising:

a detector disposed to detect said address mark; and a reproducer disposed to reproduce said information from said recording medium in synchronization with said detected address mark;

wherein said detector includes, a laser disposed to direct a beam upon said recording medium;

an optical head disposed to output an address mark signal in response to said address mark; and an address mark synchronous signal generator disposed to generate an address mark synchronous signal in synchronization with said address mark in response to said address mark signal, and said reproducer includes laser driving circuit disposed to drive said laser in synchronization with said address mark synchronous signal; and wherein said address mark is recorded by forming a wobble on at least one sidewalls of a groove, said optical head outputs a wobble signal in response to said wobble, said detector further includes a phase synchronizing circuit disposed to generate a clock signal synchronized with said wobble in response to said wobble signal; and a synchronizing circuit disposed to synchronize said clock signal with said address mark synchronous signal, and said laser driving circuit drives said laser in response to said synchronized clock signal.

8. The information reproducing apparatus according to claim 7, wherein said optical head outputs a data signal in response to data recorded on said recording medium, said information reproducing apparatus further comprising an A/D converter disposed to A/D convert said data signal in response to said synchronized clock signal.

9. An information reproducing apparatus to reproduce information from a recording medium recorded with an address mark to identify which of two addresses is an address for groove or land, comprising:

a detector disposed to detect said address mark; and a reproducer disposed to reproduce said information from said recording medium in synchronization with said detected address mark;

wherein said detector includes, a laser disposed to direct a beam upon said recording medium;

an optical head disposed to output an address mark signal in response to said address mark; and an address mark synchronous signal generator disposed to generate an address mark synchronous signal in synchronization with said address mark in response to said address mark signal, and said reproducer includes laser driving circuit disposed to drive said laser in synchronization with said address mark synchronous signal; and wherein said address mark synchronous signal generation circuit includes, a first comparator disposed to compare the level of said address mark signal with a first reference level when said laser directs a beam to an odd groove or land in said recording medium and generate said address mark synchronous signal when the level of said address mark signal reaches said first reference level; and a second comparator disposed to compare the level of said address mark signal with a second level different from said first reference level when said laser directs a beam upon an even groove or land in said recording medium and generate said address mark synchronous signal when the level of said address mark signal reaches said second reference level.

10. An information reproducing apparatus to reproduce information from a recording medium recorded with an address mark to identify which of two addresses is an address for groove or land, comprising:

a detector disposed to detect said address mark; and a reproducer disposed to reproduce said information from said recording medium in synchronization with said detected address mark;

wherein said detector includes, a laser disposed to direct a beam upon said recording medium;

an optical head disposed to output an address mark signal in response to said address mark; and an address mark synchronous signal generator disposed to generate an address mark synchronous signal in synchronization with said address mark in response to said address mark signal, and said reproducer includes laser driving circuit disposed to drive said laser in synchronization with said address mark synchronous signal; and wherein said address mark synchronous signal generator includes, a first comparator disposed to compare the level of said address mark signal with a first reference level and generate said address mark synchronous signal when the level of said address mark signal reaches said first reference level; and a second comparator disposed to compare the level of said address mark signal with a second reference level different from said first reference level and generate said address mark synchronous signal when the level of said address mark signal reaches said second reference level, said first comparator inactivating said second comparator when the level of said address mark signal reaches said first reference level, said second comparator inactivating said first comparator when the level of said address mark signal reaches said second reference level.

* * * * *

UNITED STATES PATENT AND TRADEMARK OFFICE
CERTIFICATE OF CORRECTION

PATENT NO.     : 6,400,653 B1  Page 1 of 1
DATED          : June 4, 2002
INVENTOR(S)    : Torazawa et al.

It is certified that error appears in the above-identified patent and that said Letters Patent is hereby corrected as shown below:

<u>Title page,</u>
Item [73], Assignee, delete "Sanyo Electric Co. Ltd." and insert -- Sanyo Electric Co., Ltd. --.

Signed and Sealed this

Tenth Day of September, 2002

*Attest:*

*Attesting Officer*

JAMES E. ROGAN
*Director of the United States Patent and Trademark Office*